(12) United States Patent
Fujii

(10) Patent No.: US 7,853,078 B2
(45) Date of Patent: Dec. 14, 2010

(54) SETUP-SCREEN DISPLAY CONTROLLING APPARATUS, SERVER APPARATUS, IMAGE PROCESSING SYSTEM, PRINTING APPARATUS, IMAGE PICKUP APPARATUS, DISPLAY APPARATUS, SETUP-SCREEN DISPLAY CONTROLLING METHOD, PROGRAM, AND DATA STRUCTURE

(75) Inventor: Toyoko Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 11/744,298

(22) Filed: May 4, 2007

(65) Prior Publication Data

US 2008/0130992 A1 Jun. 5, 2008

(30) Foreign Application Priority Data

May 10, 2006 (JP) ............... 2006-132023

(51) Int. Cl.
*G06K 9/00* (2006.01)
(52) U.S. Cl. .................................... 382/167
(58) Field of Classification Search ......... 382/162–167;
358/518–520; 348/223.1, 645, 649, 655, 348/675, 678, 679, 687; 345/589, 590–591, 345/593–595, 600, 619, 650
See application file for complete search history.

(56) References Cited

U.S. PATENT DOCUMENTS 6,728,421 B2 * 4/2004 Kokemohr ................. 382/284
6,847,376 B2 * 1/2005 Engeldrum et al. ......... 345/600
2003/0099411 A1 5/2003 Kokemohr
2006/0290958 A1 12/2006 Jang

FOREIGN PATENT DOCUMENTS

| EP | 1 453 002 | 9/2005 |
|---|---|---|
| JP | 08-191400 | 7/1996 |
| JP | 2001-092956 | 4/2001 |
| JP | 2002-077659 | 3/2002 |
| JP | 2004-234251 | 8/2004 |
| JP | 2004-242068 | 8/2004 |
| JP | 2005-267485 | 9/2005 |
| JP | 2006-019830 | 1/2006 |
| WO | 2005/022927 | 3/2005 |

OTHER PUBLICATIONS

Japanese Office Action dated Apr. 30, 2008 for Application No. 2006-132023.
A Japanese Office Action for Japanese Patent document 2006-132023 issued Sep. 30, 2008.
European Search Report dated Sep. 7, 2007.

* cited by examiner

*Primary Examiner*—Jose L Couso
(74) *Attorney, Agent, or Firm*—SNR Denton US LLP

(57) ABSTRACT

A setup-screen display controlling apparatus includes a sample image display controlling unit that displays a sample image in which a plurality of subject groups set for every color to be corrected are arranged on the setup screen for confirmation of a correction effect involved in adjustment of an amount of color correction; a setting-input-filed display controlling unit that displays a setting input field for the amount of color correction in the sample image; and a correspondence indicating unit that explicitly indicates the correspondence between each subject group and the corresponding setting input field for the amount of color correction in the sample image.

18 Claims, 19 Drawing Sheets

FIG. 5

| SAMPLE IMAGE DATA | SUBJECT AREA DATA | AREA ASSOCIATION DATA |
|---|---|---|

401

SETUP-SCREEN DISPLAY CONTROLLING APPARATUS, SERVER APPARATUS, IMAGE PROCESSING SYSTEM, PRINTING APPARATUS, IMAGE PICKUP APPARATUS, DISPLAY APPARATUS, SETUP-SCREEN DISPLAY CONTROLLING METHOD, PROGRAM, AND DATA STRUCTURE

CROSS REFERENCES TO RELATED APPLICATIONS

The present invention contains subject matter related to Japanese Patent Application JP 2006-132023 filed in the Japanese Patent Office on May 10, 2006, the entire contents of which are incorporated herein by reference.

BACKGROUND OF THE INVENTION

1. Field of the Invention

The present invention relates to a technology to simplify setup of image quality by a user. Particularly, the present invention relates to a setup-screen display controlling apparatus, a server apparatus, an image processing system, a printing apparatus, an image pickup apparatus, a display apparatus, a setup-screen display controlling method, a program, and a data structure.

2. Description of the Related Art

In recent years, users have increasing opportunities to print out images taken by digital cameras. For example, there are increasing opportunities for users to print images by using, for example, self-service printing apparatuses installed at shops or printing systems owned or managed by the users.

Accordingly, mechanisms for assistance of printing operations by the users are provided in such printing systems for self-service printing. The mechanisms include a function of automatically correcting the image quality, which is prepared to print highly attractive images.

Amounts of correction used in the function of automatically correcting the image quality are often set to average values preferred by the statistically greatest number of users in advance in order to avoid complicated setup operations and to support both a wide variety of users and printing of diverse images.

However, the appropriate amounts of corrections are varied depending on the preference of users or the content of image data. Consequently, the correction by using average values that are statistically set does not provide printing results most suitable for the preference of the users or the content of the image data even if print results having acceptable image qualities are provided by the correction.

Accordingly, a function of reflecting the preference of each user is added to existing image processing. For example, a mechanism of specifying an arbitrary color or area to adjust the color tone of each color or area is provided in the existing image processing. However, existing correction technologies have excessively high flexibilities and, therefore, it is difficult to yield desired correction results.

Japanese Unexamined Patent Application Publication No. 2004-234251 discloses an image forming apparatus having a function of correcting, for example, the brightness, hue, contrast, and sharpness of an image by selecting an optimal color profile from multiple color profiles prepared in advance.

However, the technology disclosed in Japanese Unexamined Patent Application Publication No. 2004-234251 has problems in that it is complicated to register in advance personal information, such as the age and address of a user, and that the correction on the basis of correction items including the brightness, hue, contrast, and sharpness is not matched with the skills of users. In other words, this technology is unkind to users who have no specialized knowledge but is too rough on users who have the specialized knowledge.

Japanese Unexamined Patent Application Publication No. 2005-267485 discloses an image forming system that receives and stores results of printing by users and reflects the states of the print results in control parameters, as needed, in image formation.

However, the control parameters are only average values preferred by many users and are not correction values optimized to the preference of each user or the content of image data. In addition, since the control parameters are average values for the many users, there is a problem in that the users cannot confirm how their preferences are reflected in corrected images.

SUMMARY OF THE INVENTION

In order to resolve the above problems, according to an embodiment of the present invention, there is provided a setup-screen display controlling apparatus including a sample image display controlling unit that displays a sample image in which a plurality of subject groups set for every color to be corrected are arranged on the setup screen for confirmation of a correction effect involved in adjustment of an amount of color correction; a setting-input-filed display controlling unit that displays a setting input field for the amount of color correction in the sample image; and a correspondence indicating unit that explicitly indicates the correspondence between each subject group and the corresponding setting input field for the amount of color correction in the sample image.

According to another embodiment of the present invention, there is provided a server apparatus including a sample image display controlling unit that displays a sample image in which a plurality of subject groups set for every color to be corrected are arranged on a screen of a client terminal connected to the server apparatus over a network for confirmation of a correction effect involved in adjustment of an amount of color correction; a setting-input-filed display controlling unit that displays a setting input field for the amount of color correction in the sample image on the screen of the client terminal; and a correspondence indicating unit that explicitly indicates the correspondence between each subject group and the corresponding setting input field for the amount of color correction in the sample image on the screen of the client terminal.

According to another embodiment of the present invention, there is provided an image processing system including a sample image display controlling unit that displays a sample image in which a plurality of subject groups set for every color to be corrected are arranged for confirmation of a correction effect involved in adjustment of an amount of color correction; a setting-input-filed display controlling unit that displays a setting input field for the amount of color correction in the sample image; a correspondence indicating unit that explicitly indicates the correspondence between each subject group and the corresponding setting input field for the amount of color correction in the sample image; a correction information storage unit that stores the amount of color correction; and an image correction unit that performs color correction to image data on the basis of the amount of color correction read out from the correction information storage unit.

According to another embodiment of the present invention, there is provided a printing apparatus including a display device; a sample image display controlling unit that displays a sample image in which a plurality of subject groups set for every color to be corrected are arranged on a screen of the display device for confirmation of a correction effect involved in adjustment of an amount of color correction; a setting-input-filed display controlling unit that displays a setting input field for the amount of color correction in the sample image on the screen of the display device; a correspondence indicating unit that explicitly indicates the correspondence between each subject group and the corresponding setting input field for the amount of color correction in the sample image on the screen of the display device; a correction information storage unit that stores the amount of color correction; an image correction unit that performs color correction to image data on the basis of the amount of color correction read out from the correction information storage unit; and an image forming device that forms an image on a recording medium on the basis of the image data subjected to the color correction.

According to another embodiment of the present invention, there is provided an image pickup apparatus including an image pickup unit; a display device; a sample image display controlling unit that displays a sample image in which a plurality of subject groups set for every color to be corrected are arranged on a screen of the display device for confirmation of a correction effect involved in adjustment of an amount of color correction; a setting-input-filed display controlling unit that displays a setting input field for the amount of color correction in the sample image on the screen of the display device; a correspondence indicating unit that explicitly indicates the correspondence between each subject group and the corresponding setting input field for the amount of color correction in the sample image on the screen of the display device; a correction information storage unit that stores the amount of color correction; and an image correction unit that performs color correction to image data that is picked up by the image pickup unit on the basis of the amount of color correction read out from the correction information storage unit.

According to another embodiment of the present invention, there is provided an image pickup apparatus including an image pickup unit; a display device; a sample image display controlling unit that displays a sample image in which a plurality of subject groups set for every color to be corrected are arranged on a screen of the display device for confirmation of a correction effect involved in adjustment of a correction effect involved in adjustment of an amount of color correction; a setting-input-filed display controlling unit that displays a setting input field for the amount of color correction in the sample image on the screen of the display device; a correspondence indicating unit that explicitly indicates the correspondence between each subject group and the corresponding setting input field for the amount of color correction in the sample image on the screen of the display device; and a correction information storage unit that stores the amount of color correction as additional data concerning image data that is picked up by the image pickup unit.

According to another embodiment of the present invention, there is provided a display apparatus including a display device; a sample image display controlling unit that displays a sample image in which a plurality of subject groups set for every color to be corrected are arranged on a screen of the display device for confirmation of a correction effect involved in adjustment of an amount of color correction; a setting-input-filed display controlling unit that displays a setting input field for the amount of color correction in the sample image on the screen of the display device; a correspondence indicating unit that explicitly indicates the correspondence between each subject group and the corresponding setting input field for the amount of color correction in the sample image on the screen of the display device; a correction information storage unit that stores the amount of color correction; and an image correction unit that performs color correction to image data on the basis of the amount of color correction read out from the correction information storage unit.

According to another embodiment of the present invention, there is provided a setup-screen display controlling method including the steps of displaying a sample image in which a plurality of subject groups set for every color to be corrected are arranged for confirmation of a correction effect involved in adjustment of an amount of color correction; displaying a setting input field for the amount of color correction in the sample image; and explicitly indicating the correspondence between each subject group and the corresponding setting input field for the amount of color correction in the sample image.

According to another embodiment of the present invention, there is provided a program causing a computer to execute the steps of displaying a sample image in which a plurality of subject groups set for every color to be corrected are arranged for confirmation of a correction effect involved in adjustment of an amount of color correction; displaying a setting input field for the amount of color correction in the sample image; and explicitly indicating the correspondence between each subject group and the corresponding setting input field for the amount of color correction in the sample image.

According to another embodiment of the present invention, there is provided a data structure including sample image data concerning a sample image in which a plurality of subject groups set for every color to be corrected are arranged for confirmation of a correction effect involved in adjustment of an amount of color correction; and association data used to associate each subject group with a setting input field for the amount of color correction.

According to the present invention, it is possible to provide a setup screen (user interface) with which a user can easily and properly set and input an amount of correction independently of the skill of the user.

BRIEF DESCRIPTION OF THE DRAWINGS

FIG. 5 shows an example of data structure;

DESCRIPTION OF THE PREFERRED EMBODIMENTS

A technology of controlling display of a setup screen according to an embodiment of the present invention will now be described. Known technologies in related art are applied to parts that are not illustrated and described in this specification. Embodiments of the present invention are only exemplified and are not limited to the ones described in this specification.

Application to Printing System

Application of a setup-screen display controlling function according to an embodiment of the present invention to a printing system will now be described. It is assumed that the printing system includes a display device capable of displaying a user interface screen.

The printing system is, for example, a self-service printing apparatus installed at a shop, an office or home printing system, a printing apparatus used in a medical institution, a printing apparatus used for manufacturing clothing, or a multifunction peripheral including a scanner, which includes the display device.

Any image forming device that forms an image on a recording medium and that is appropriate for the field of application or the printing system is used in the printing system. For example, a print head and its mechanism to form an image by discharge of ink drops, a printing mechanism to transfer an image (toner) reproduced on a photosensitive member with a radiated laser beam to a recording medium, or a dye-sublimation print head and its mechanism to form an image on a recording medium by sublimation of solid ink can be used as the image forming device.

Hardware Configuration

Figure 1:
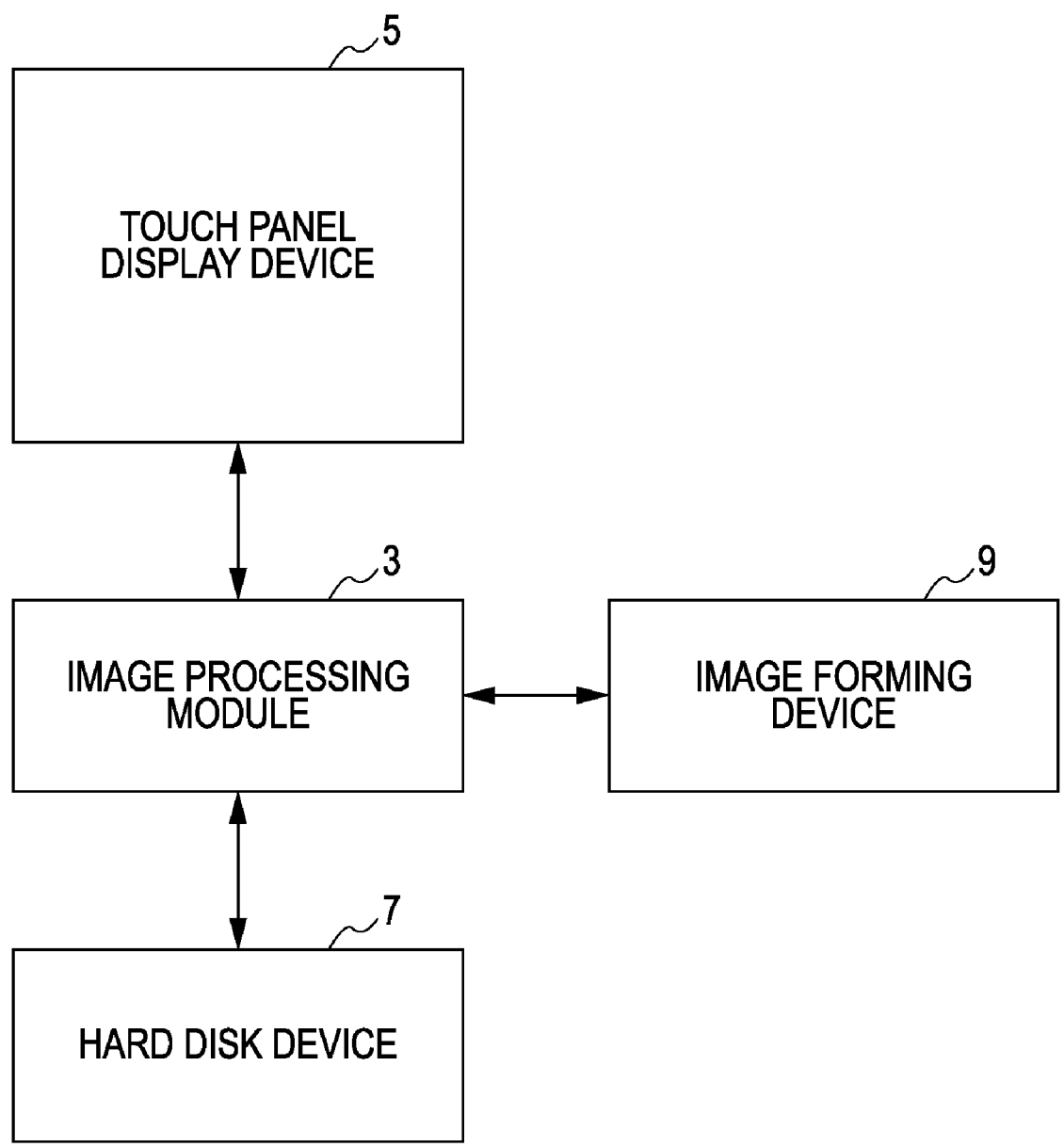
FIG. 1 is a block diagram schematically showing an example of the hardware configuration of a printing system according to an embodiment of the present invention.

FIG. 1 is a block diagram schematically showing an example of the hardware configuration of a printing system 1 according to an embodiment of the present invention. FIG. 1 is a conceptual diagram of the printing system 1 and shows only basic components.

The printing system 1 includes an image processing module 3, a touch panel display device 5, a hard disk device 7, and an image forming device 9.

The image processing module 3 functions as a processing device that controls the entire printing system 1 and that performs a variety of image processing necessary for printing an image and display of user interfaces.

The image processing includes conversion of RGB data into CMYK data, gamma correction, color correction, and other image quality correction.

The displayed user interfaces include a screen in which an amount of correction defining the content of correction of the image quality is set, a screen in which a printed image is selected, and a screen in which the number of printed copies is selected.

The touch panel display device 5 is an integrated display device having a contact-type input unit arranged on the surface of the display screen. The contact-type input unit includes a sensor element that detects the position where the screen is touched with (contact with) a finger of a user or a dedicated pen and that is coated with a transparent screen. In other words, the display device is integrated with the input unit in the touch panel display device 5. The display device need not be integrated with the input unit. The input unit (including buttons and switches) may be separated from the display device.

The hard disk device 7 is a storage device used as a storage area of, for example, image data and the amount of correction. According to this embodiment of the present invention, image data before the correction, corrected image data, the amount of correction set by the user with the setup screen, and so on are stored in the hard disk device 7.

The hard disk device 7 is only exemplified and a storage device other than the magnetic storage device may be used.

For example, a semiconductor storage device or an optical storage device that uses light to record or reproduce data may be used as the hard disk device 7. The storage device may be incorporated in the printing system 1 or may be externally attached to the printing system 1. The storage device may be a portable storage device that is detachable form the printing system 1. The storage device may be provided on the Internet or another network.

The image forming device 9 forms an image on a recording medium. As described above, various kinds of image forming devices can be used as the image forming device 9. According to this embodiment of the present invention, it is assumed that the printing system 1 is a self-service printing system and that a dye-sublimation print head and its mechanism are used as the image forming device 9.

Figure 2:
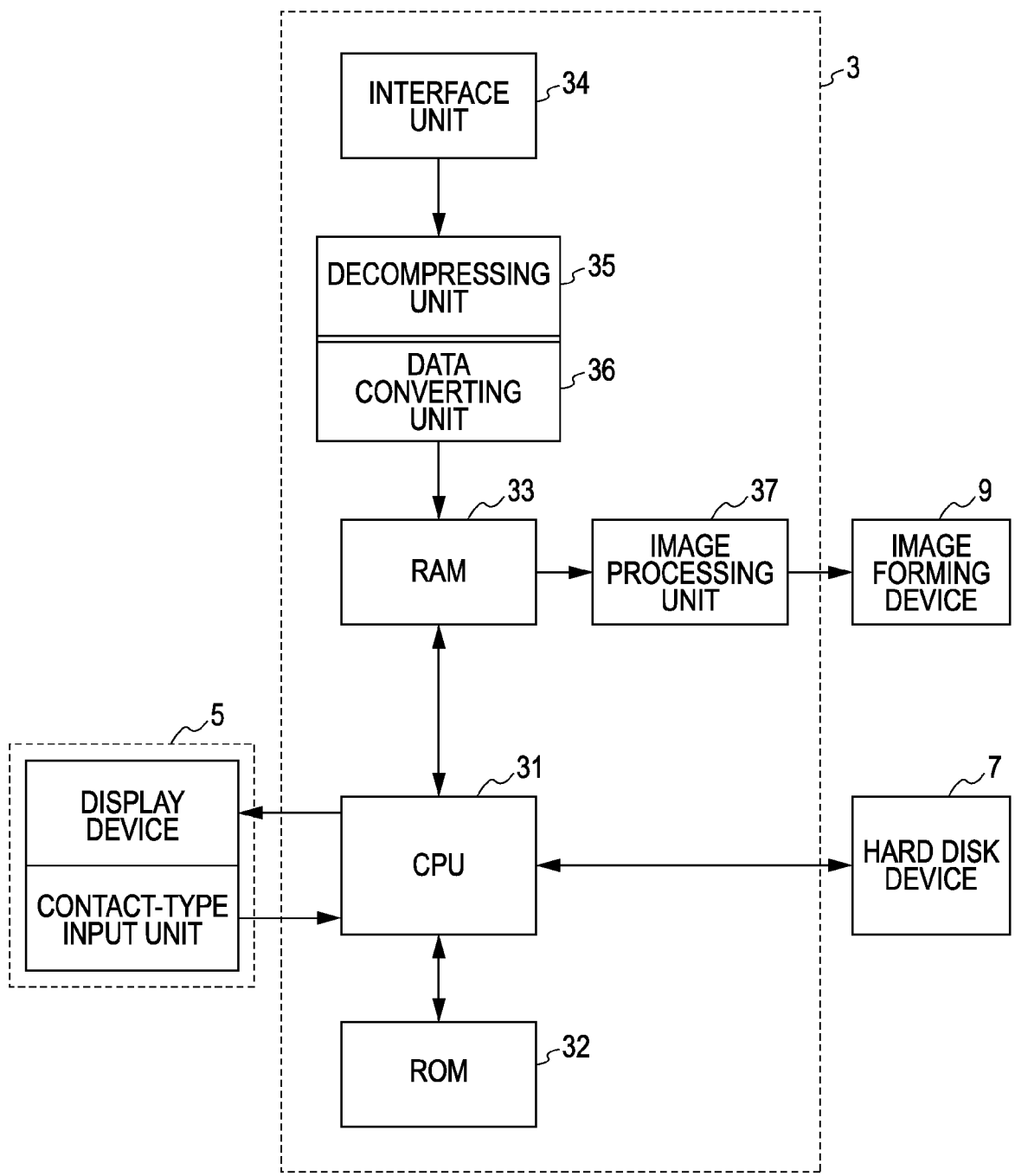
FIG. 2 is a block diagram showing an example of the configuration of the printing system in detail.

FIG. 2 is a block diagram showing an example of the configuration of the printing system 1 in detail.

The image processing module 3 according to the embodiment of the present invention includes a central processing unit (CPU) 31, a read only memory (ROM) 32, a random access memory (RAM) 33, an interface unit 34, a decompressing unit 35, a data converting unit 36, and an image processing unit 37.

The CPU 31, the ROM 32, and the RAM 33 form a computer. The CPU 31 executes processes described in programs stored in the ROM 32 to control the entire printing system 1. The programs include a program for display of a setup screen of the amount of correction used in image correction. The RAM 33 is a working area temporarily storing programs and image data.

The interface unit 34 is used to acquire image data from an external storage device. An interface conforming to the type or specification of the storage medium is used as the interface unit 34. The interface unit 34 supports a function of receiving image data over the Internet or another network.

The decompressing unit 35 is a processing device that decompresses compressed image data into decompressed image data. Since the image data generally has a larger size, the image data is compressed and encoded in storage and transmission. The decompressing unit 35 performs signal processing to decompress compressed image data into decompressed image data.

The decompressing unit 35 decompresses image data compressed in, for example, Joint Photographic Experts Group (JPEG) format. If the image data is not compressed, the decompressing unit 35 supplies the acquired image data to the data converting unit 36 without the decompression.

The data converting unit 36 functions as a processing device that converts the image data into a primary color data (RGB data) format and that varies the size of the image. The image data converted into the primary color data format is stored in the RAM 33.

If the image data is compressed image data, the data converting unit 36 converts the image date into a format including luminance (Y) data and chrominance (Cb and Cr) data. The data converting unit 36, then, converts the image data in the format including the luminance (Y) data and the chrominance (Cb and Cr) data into the primary color data (RGB data) format and varies the size of the image.

The image processing unit 37 functions as a processing device that performs color conversion of the image data in the primary color data (RGB data) format into image data in a complementary color data (Y(yellow), M(magenta), C(cyan), and K(black)) format. The image processing unit 37 performs automatic correction of the image data on the basis of the amount of correction set in advance and also performs the gamma correction and error diffusion.

Function of Displaying Interface Screen

Figure 3:
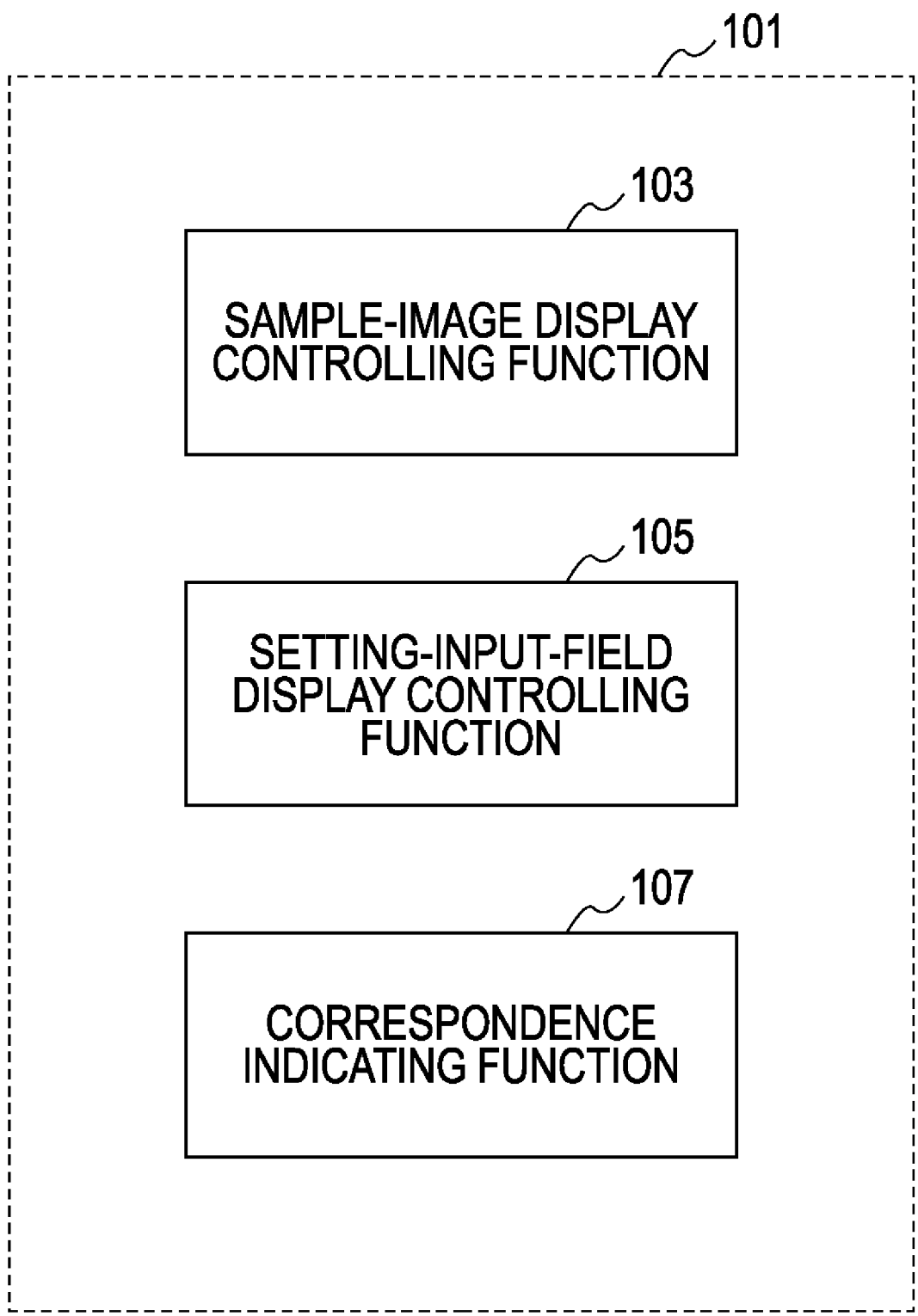
FIG. 3 shows an example of the functional configuration to realize a setup-screen display controlling function according to an embodiment of the present invention.

FIG. 3 shows an example of the functional configuration to realize the function of displaying an interface screen in order to set the amount of correction, according to an embodiment of the present invention. This function is hereinafter referred to as a "setup-screen display controlling function" in this specification.

A setup-screen display controlling function 101 includes three sub-functions: a sample-image display controlling function 103, a setting-input-filed display controlling function 105, and a correspondence indicating function 107.

The sample image display controlling function 103 is used to display a sample image in which multiple subject groups set for every color to be corrected are arranged for confirmation of a correction effect involved in adjustment of the amount of color correction.

Figure 4:
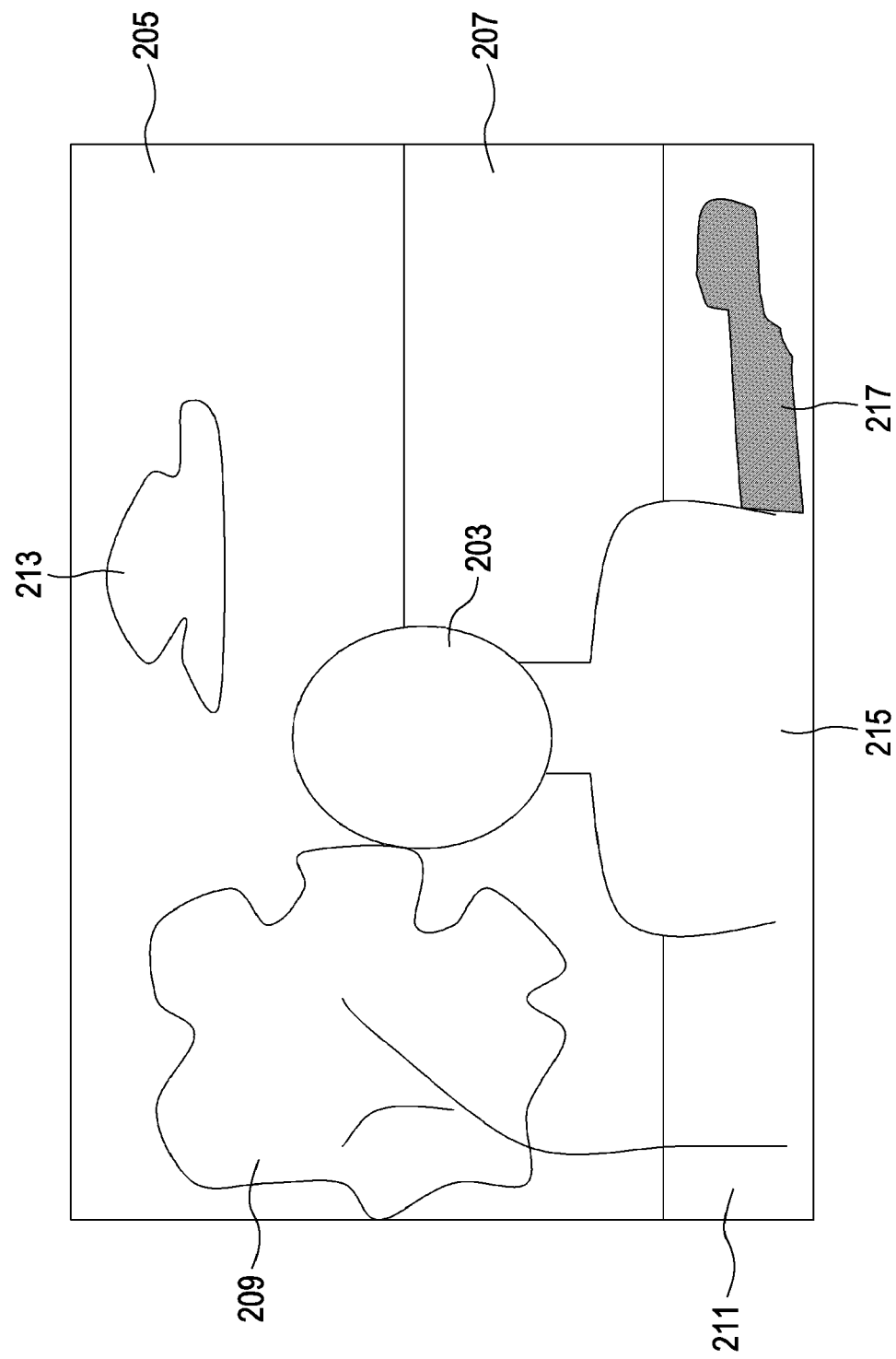
FIG. 4 shows an example of a sample image in which subject groups are set, according to an embodiment of the present invention.

FIG. 4 shows an example of a sample image 201 according to an embodiment of the present invention. The sample image 201 is prepared by a manufacturer or a provider of the service in advance so that the user can easily confirm the content of the image correction and the correction effect independently of the skill of the user. A screen arbitrarily selected by the user may be used.

The sample image 201 according to the embodiment of the present invention is stored in the ROM 32. The sample image 201 includes five subject groups in which the preference of the user is likely to appear and in which the color tones can be easily confirmed. Specifically, the sample image 201 includes the subject groups of five colors including a face color (flesh color), blue, green, white (gray), and black, of which the color tones can be easily confirmed.

In the above point of view, the sample image 201 includes the subject groups of a face color (flesh color) 203, the sky (blue) 205, the sea (blue) 207, a leaf (green) 209, a grass (green) 211, a cloud (white) 213, a shirt (white) 215, and a shadow (black) 217.

The arrangement of the subject groups corresponding to these five colors in one screen allows all the amounts of correction necessary for the image processing to be set in one screen.

Referring back to FIG. 3, the setting-input-filed display controlling function 105 is used to display a setting input field for the amount of color correction on the screen. In the determination of the amount of correction, it is desirable to realize the adjustment of the amount of correction and the confirmation of the correction effect on the same screen in terms of the operation efficiency.

The correspondence indicating function 107 is used to explicitly indicate the correspondence between each subject group and the setting input field for the amount of color correction on the screen. The presence of the correspondence indicating function 107 allows the correspondence between the adjustment operation of the amount of correction and the confirmation area of the correction effect to be explicitly indicated.

Area association data used to associate area information concerning the subject group with the setting input field is stored in the ROM 32. FIG. 5 shows an example of data structure. The data shown in FIG. 5 includes sample image data, subject area data, and the area association data. The correspondence indicating function 107 uses the "subject area data" and the "area association data" to explicitly indicate the correspondence.

According to this embodiment of the present invention, the correspondence is explicitly indicated when a subject group for which the correspondence of this kind is registered is selected on the screen or when a setting input field used in the adjustment of the amount of color correction is selected on the screen.

According to this embodiment of the present invention, the correspondence between each subject group and the setting input field is shown by using a thick line connecting the subject group to the setting input field.

FIGS. 6 to 10 show examples of display of the correspondence between each subject group and the setting input field.

As shown in FIGS. 6 to 10, both the outer edge of the area of the subject group and the outer edge of the setting input field are highlighted with thick lines to explicitly indicate the correspondence. The indication of the outer edge of the area of each subject group with the thick line can clearly show the correspondence between the adjustment operation of the amount of correction and the confirmation area of the correction effect.

Figure 6:
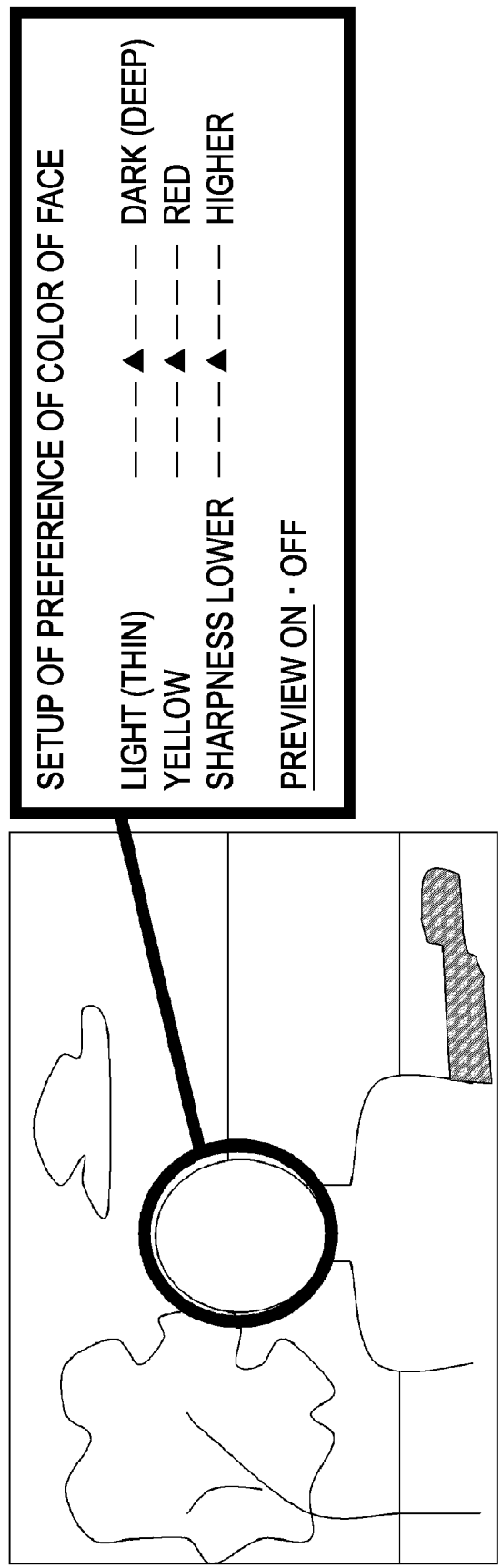
FIG. 6 shows an example of a display screen indicating the correspondence between a subject group and a setting input field.

FIG. 6 shows an example of a display screen used to correct the face color (flesh color) to a favorite color tone. The minimum adjustment items are shown in the setting input field and only slider buttons are used to perform the adjustment. The adjustment items are intuitively represented. According to this embodiment of the present invention, only three adjustment items are provided for the face color (flesh color). Specifically, "the face color is to be made dark or light", "yellow is to be toned up or red is to be toned up", and "sharpness is to be increased or decreased" are adjusted for the face color (flesh color).

Figure 7:
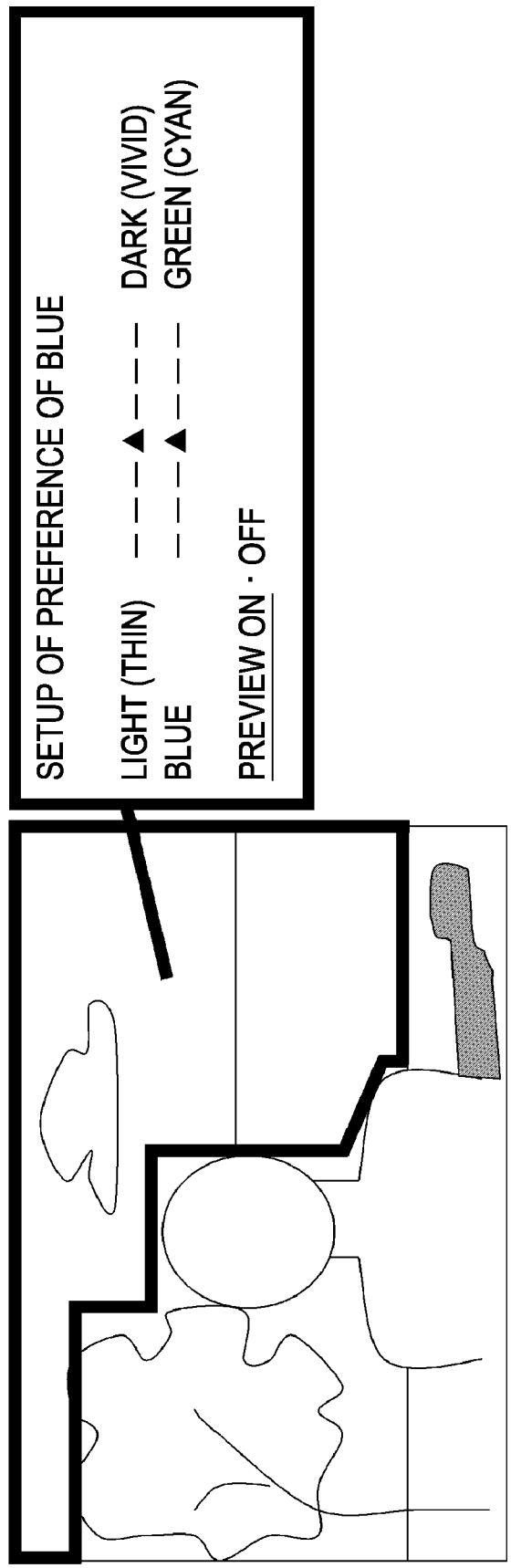
FIG. 7 shows another example of the display screen indicating the correspondence between a subject group and a setting input field.

FIG. 7 shows an example of a display screen used to correct the blue color tone typified by the sky and the sea to a favorite color tone. According to this embodiment of the present invention, only two adjustment items: "the color is to be made dark or light" and "blue is to be toned up or green is to be toned up" are provided for the blue color tone.

Figure 8:
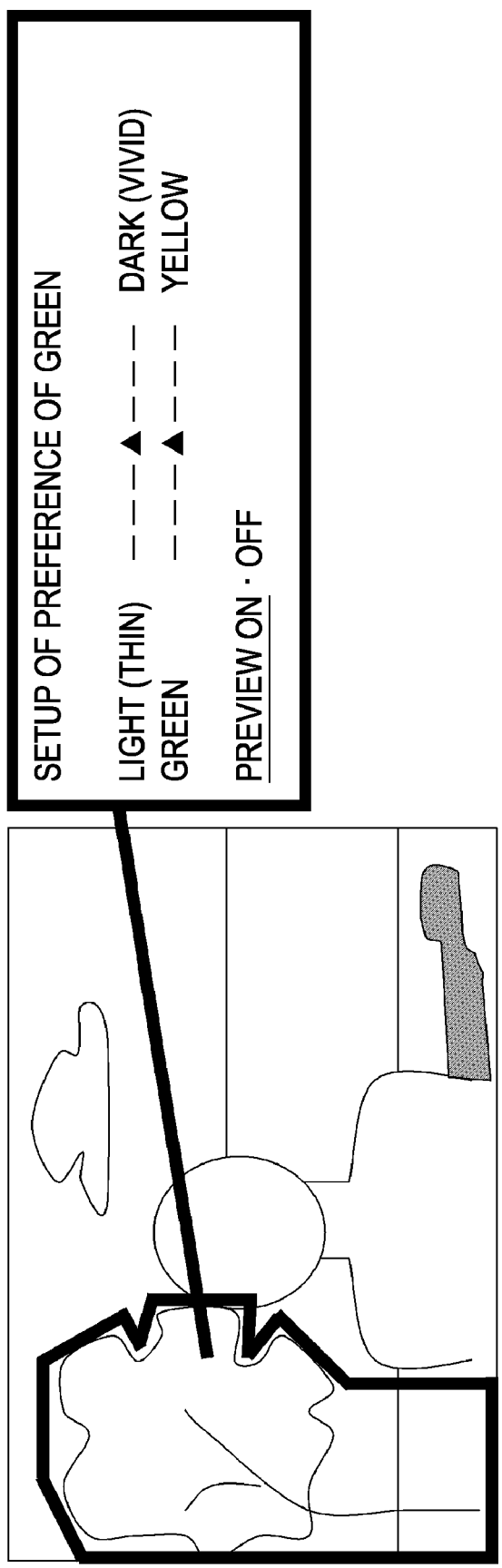
FIG. 8 shows another example of the display screen indicating the correspondence between a subject group and a setting input field.

FIG. 8 shows an example of a display screen used to correct the green color tone typified by a leaf and a grass to a favorite color tone. According to this embodiment of the present invention, only two adjustment items: "the color is to be made dark or light" and "green is to be toned up or yellow is to be toned up" are provided for the green color tone.

Figure 9:
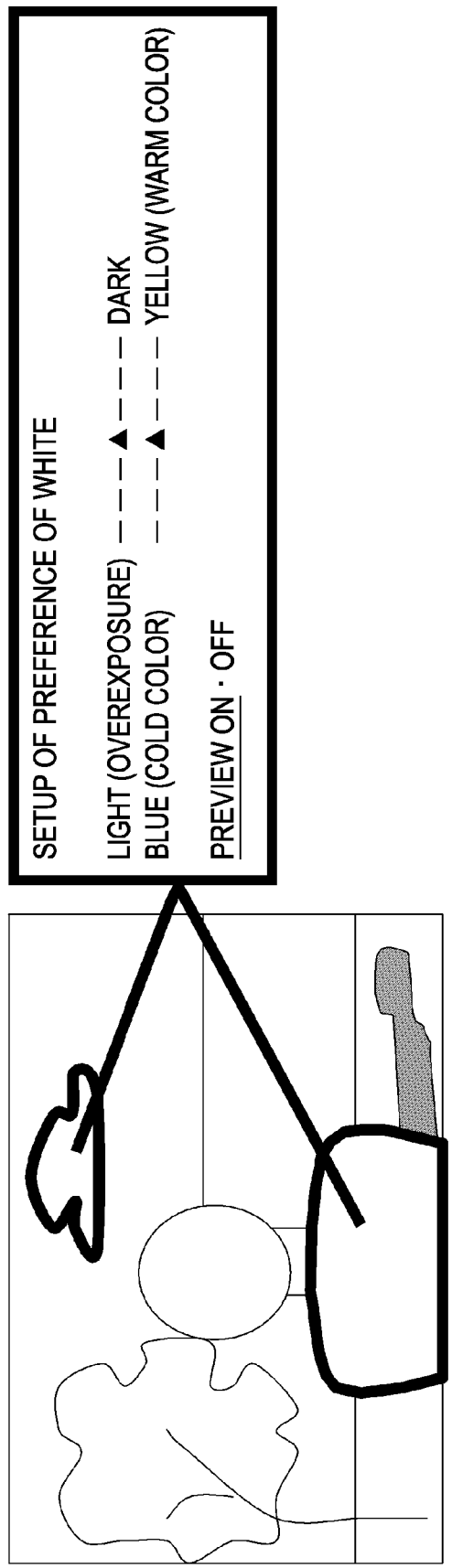
FIG. 9 shows another example of the display screen indicating the correspondence between a subject group and a setting input field.

FIG. 9 shows an example of a display screen used to correct the white (gray) color tone typified by a cloud and a shirt to a favorite color tone. According to this embodiment of the present invention, only two adjustment items: "the color is to be made dark or light (overexposure)" and "blue (cold color) is to be toned up or yellow (warm color) is to be toned up" are provided for the white (gray) color tone.

Figure 10:
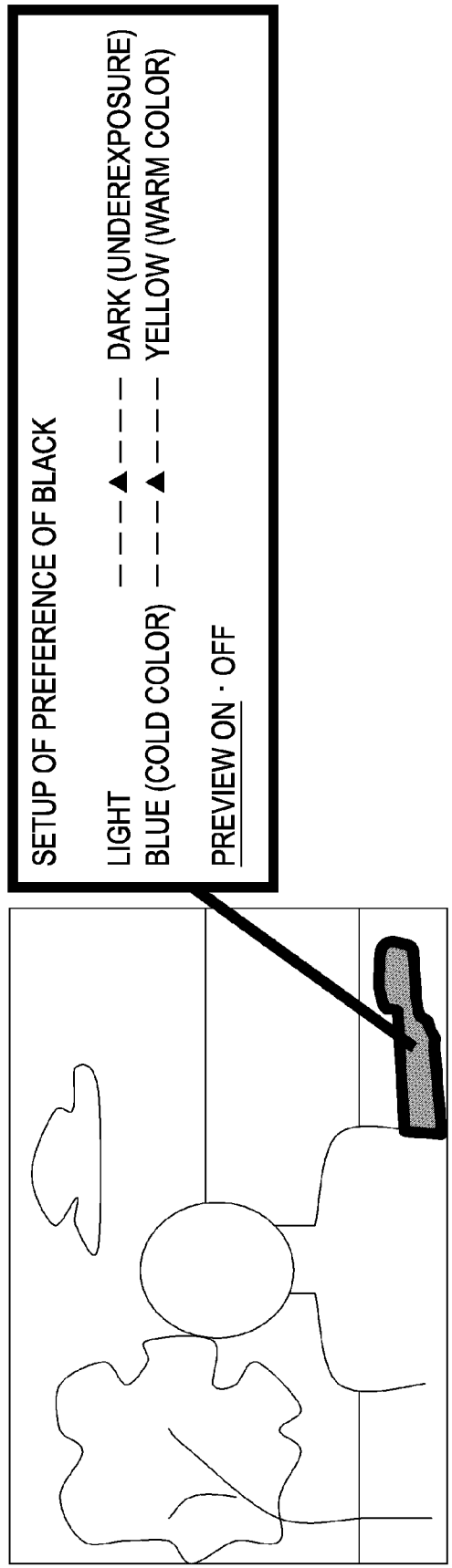
FIG. 10 shows another example of the display screen indicating the correspondence between a subject group and a setting input field.

FIG. 10 shows an example of a display screen used to correct the black color tone typified by a nightscape and a shadow to a favorite color tone. According to this embodiment of the present invention, only two adjustment items: "the color is to be made dark (underexposure) or light" and "blue (cold color) is to be toned up or yellow (warm color) is to be toned up" are provided for the black color tone.

An icon for selection of turning-on or turning-off of a preview display is provided in each setting input field. When the preview display is turned on, an image before the adjustment is displayed in contrast to an image after the adjustment.

Figure 11:
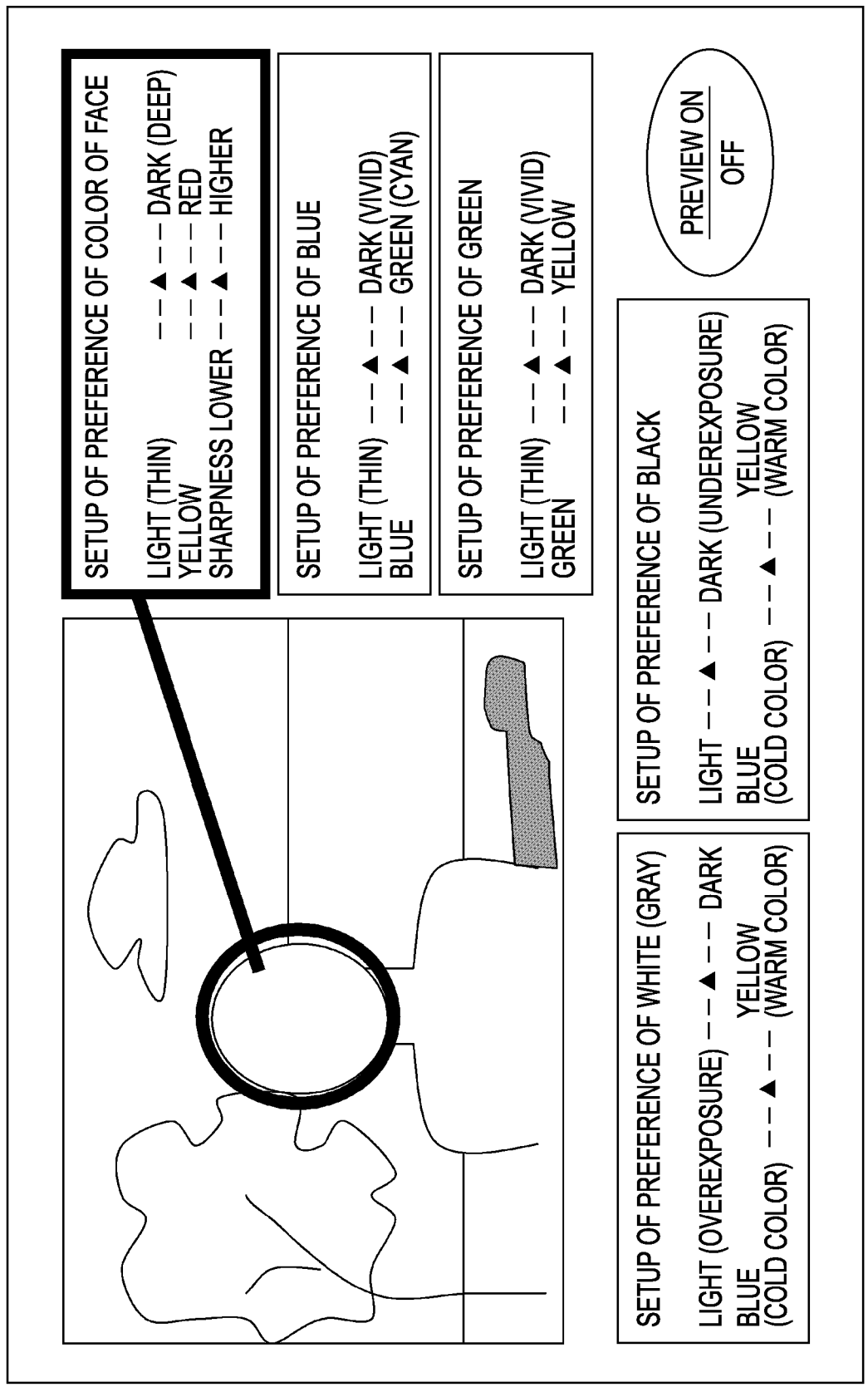
FIG. 11 shows an example of a displayed sample image.

FIG. 11 shows an example of a displayed user interface screen that is actually used.

Adjustment of Amount of Correction with Setup Screen

The adjustment operation of the amount of correction with the setup screen will now be described.

Figure 12:
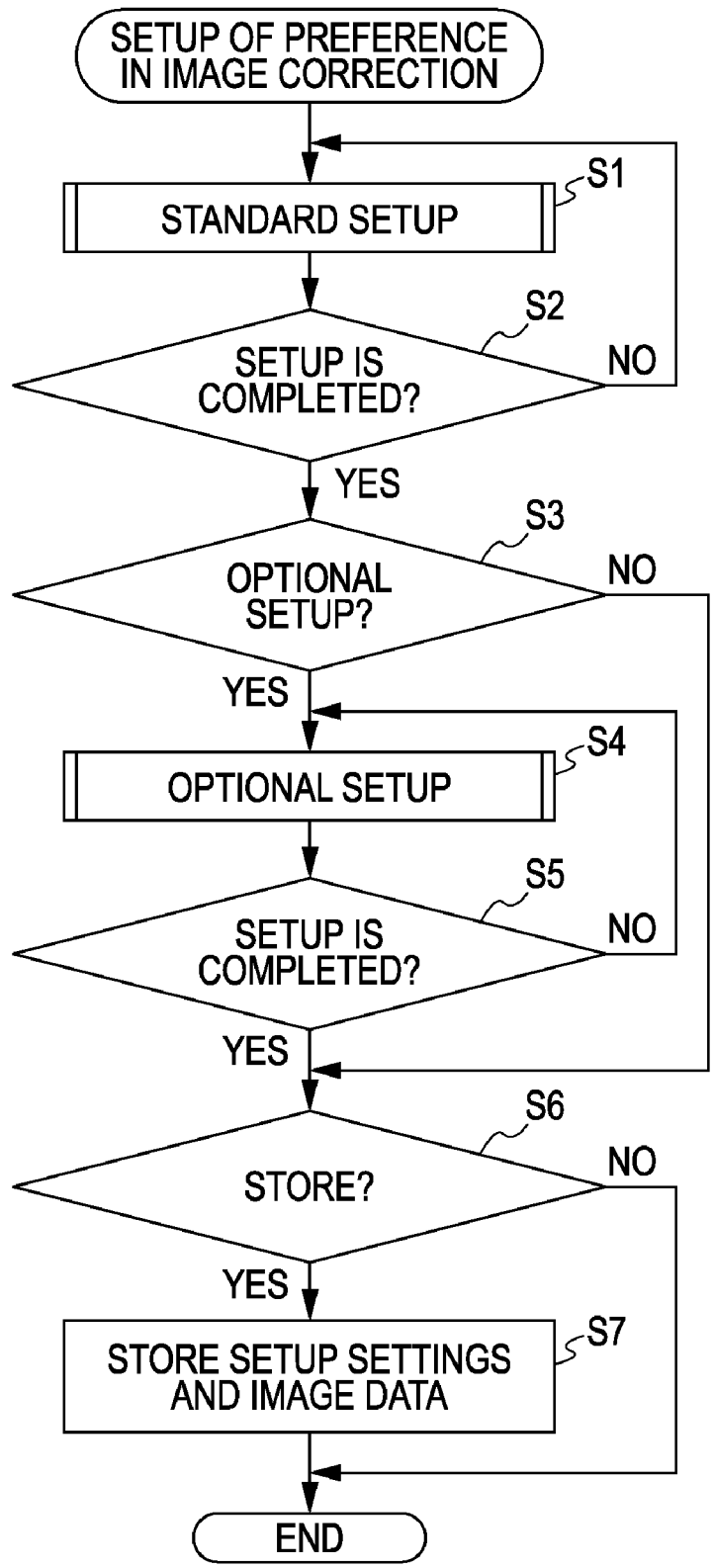
FIG. 12 is a flowchart showing an example of a process of setting an amount of correction to correct the color tone of an image to the one suited to the preference of a user, according to an embodiment of the present invention.

FIG. 12 is a flowchart showing an example of a correction process according to an embodiment of the present invention. In Step S1, the CPU 31 performs a standard setup process of the amount of correction. The standard setup means the adjustment of the amount of correction in the sample image 201 described above.

Figure 13:
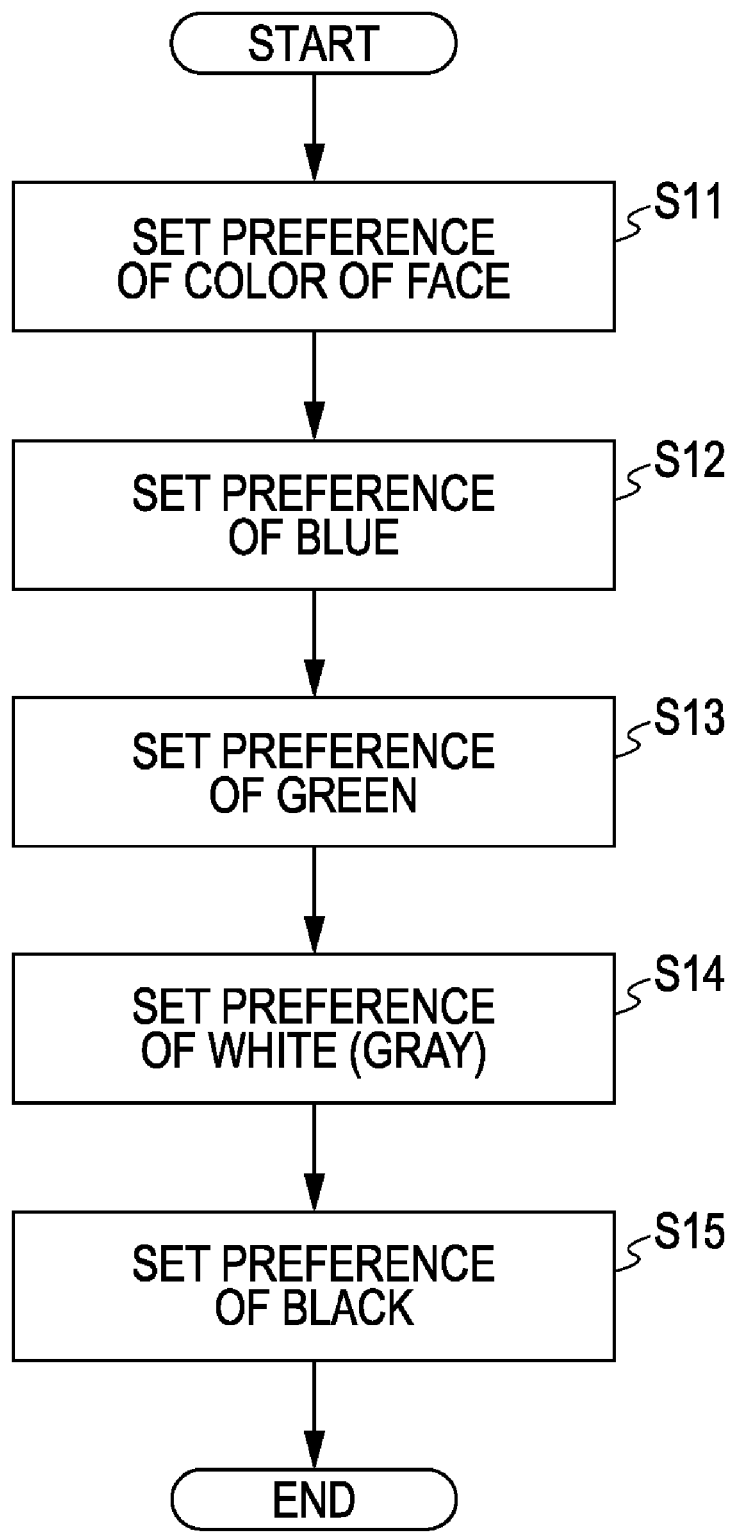
FIG. 13 is a flowchart showing an example of a standard setup process of the amount of correction according to an embodiment of the present invention.

FIG. 13 is a flowchart showing an example of the standard setup process of the amount of correction. As shown in FIG. 13, the amount of correction is set in the following order: the preference of the face color is set in Step S11, the preference of blue is set in Step S12, the preference of green is set in Step S13, the preference of white (gray) is set in Step S14, and the preference of black is set in Step S15. The user may change the order of the setup or may perform part of the setup steps.

As described above, the setup of the amount of correction is performed through the movement of the slider button corresponding to the adjustment item in the setting input field and through the confirmation of the result of the correction operation performed in accordance with the position of the slider button as a variation in the image quality of the corresponding subject group.

If the amount of correction has been already set, a sample image resulting from the image correction of each subject group on the basis of the set amount of correction is displayed.

The user confirms and adjusts the color tone of the five colors while confirming the image displayed in the sample image 201.

Referring back to FIG. 12, in Step S2, the CPU 31 determines whether the setup is completed. The standard setup process is continued until the CPU 31 determines in Step S2 that the setup is completed. Printing the sample image before the standard setup operation is completed and comparing the printed result with the display in the sample image can make the image quality closer to the preference of the user.

In Step S3, the CPU 31 determines whether the user wants to adjust the image quality by an optional setup process.

The optional setup is an existing adjustment mode having a higher optionality. The optional setup is targeted at a higher skilled user.

Figure 14:
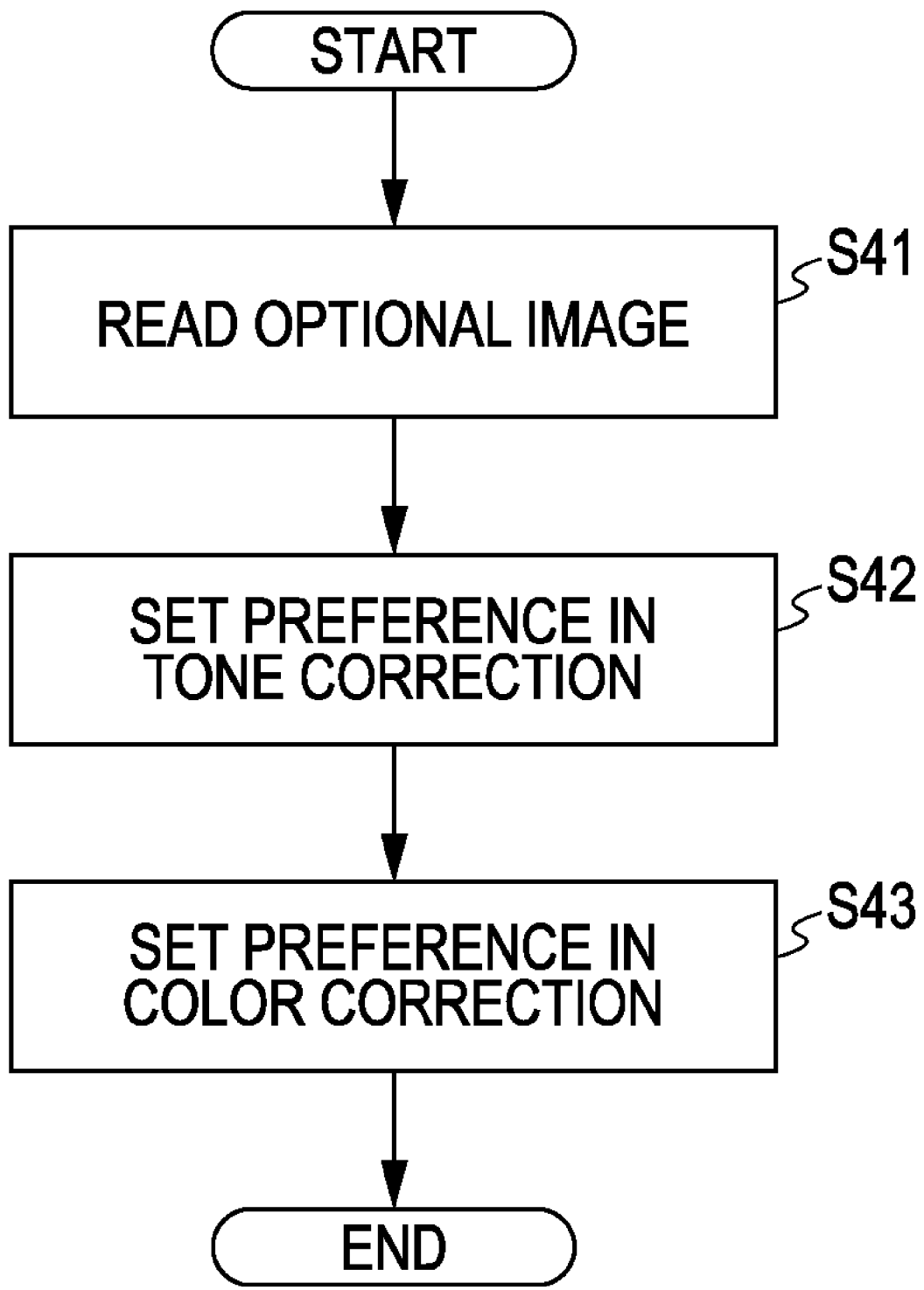
FIG. 14 is a flowchart showing an example of an optional setup process of the amount of correction according to an embodiment of the present invention.

If the CPU 31 determines in Step S3 that the optional setup is selected, then in Step S4, the CPU 31 performs an optional setup process shown in FIG. 14.

The optional setup process aims to optimize the color tone and the image quality of a certain area or of each image.

In the optional setup process in FIG. 14, in Step S41, the CPU 31 reads a target image (optional image). In Step S42, the CPU 31 sets up the preference in the tone correction. In Step S43, the CPU 31 sets up the preference in the color correction. The user may change the order of the setup steps or may perform part of the setup steps.

The optional setup process is also continued until the CPU 31 determines in Step S5 that the optional setup is completed.

In Step S6, the CPU 31 determines whether the set correction value is to be stored. If the CPU 31 determines that the set correction value is to be stored, then in Step S7, the CPU 31 stores the amount of correction in the hard disk device 7.

It is desirable that the correction value be stored along with additional information, such as the name of a user who performs the setup and the date and time when the setup is performed. The storage of the correction value along with the additional information allows the image to be printed out in an image quality suited to the preference of each user even if the printing system is shared between multiple users.

Advantages

As described above, it is possible to make the color tone of the image printed after the color correction close to the preference of the user by displaying the image including the subject groups corresponding to the five colors in which the preferable of the user is most reflected in the sample image used in the setup of the amount of correction.

Since the correspondence between each subject group and the color to be corrected (the setting input field) is explicitly indicated by the thick line in the sample image 201, it is possible to clearly show the correspondence between the adjustment operation of the amount of correction and the area in which the correction result is reflected.

In addition, since the correspondence between each subject group and the color to be corrected (the setting input field) is explicitly indicated, a variation in the image quality involved in the adjustment of the amount of correction can be easily confirmed. Accordingly, it becomes easy to confirm the correction effect and it is possible to realize the interface screen where any user can easily confirm the correction effect.

The adjustment items displayed in the setting input field are intuitively represented such that even lower skilled users can easily understand. In addition, it is enough to move the slider button of each adjustment item from the central position to either side in accordance with the amount of correction in order to adjust the amount of correction. Accordingly, the adjustment operation of the amount of correction can be intuitively performed to simplify the adjustment operation by the user.

The provision of the On and Off key for the preview display allows the image before the amount of correction is set to be compared with the image after the amount of correction is setup.

Since the correction can be continued while comparing the images printed before and after the amount of correction is set with the image displayed in the screen, it is possible to properly set the amount of correction.

Application to Other Systems

Application of the mechanism for setting the amount of correction used in the image correction in the sample image to systems other than the printing system will now be described.

Image Processing System

Figure 15:
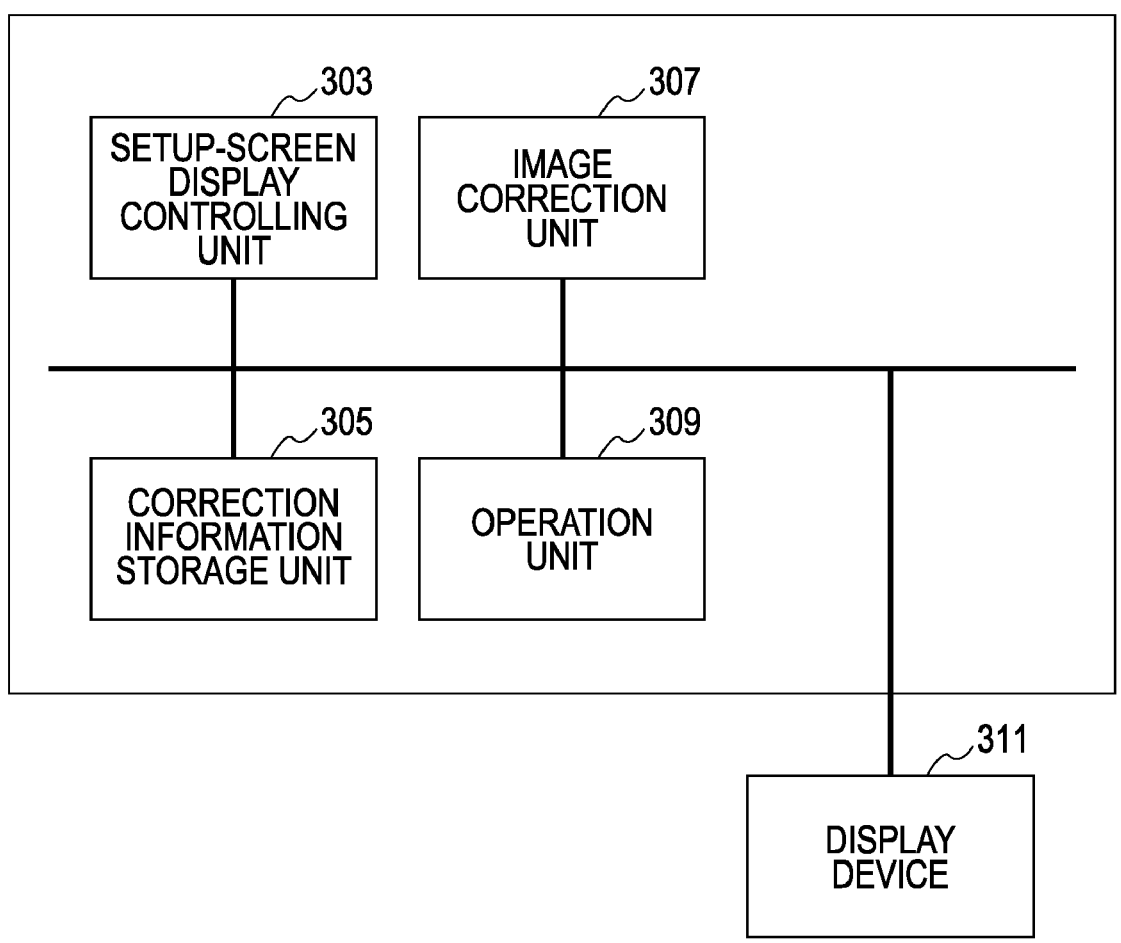
FIG. 15 is a block diagram showing an example of the configuration of an image processing system to which the setup-screen display controlling function is applied according to an embodiment of the present invention.

FIG. 15 is a block diagram showing an example of the configuration of an image processing system 301 to which the setup-screen display controlling function is applied according to an embodiment of the present invention. The image processing system 301 includes a setup-screen display controlling unit 303, a correction information storage unit 305, an image correction unit 307, an operation unit 309, and a display device 311. These processing functions are realized by software processing executed in the computer.

The setup-screen display controlling unit 303 is a processing device that controls the display of the sample image 201, described above, used for setting the amount of correction and the display of the screen involved in the setup of the amount of correction using the sample image 201.

The correction information storage unit 305 is a storage area where the set amount of correction is stored. The image correction unit 307 is a processing device that performs, for example, the color correction of the image data on the basis of the set amount of correction. The operation unit 309 is, for example, a mouse, a cursor, or another pointing device used by the user to input instructions about the correction function and the like.

The display device 311 is a display area where a user interface screen or a content image is displayed. In the example shown in FIG. 15, the display device 311 is externally attached to the image processing system 301. The display device 311 may be integrated with the image processing system 301.

The image processing system 301 is, for example, a computer, a personal digital assistant (a portable personal computer, a mobile telephone, a portable video game player, or a digital book), an image recording apparatus, an image reproducing apparatus, or an image editor.

The provision of the setup-screen display controlling function described above in such an image processing system allows the color tone of a displayed image, a printed image, or a recorded image to be easily and properly suited to the preference of the user.

Image Pickup System

Figure 16:
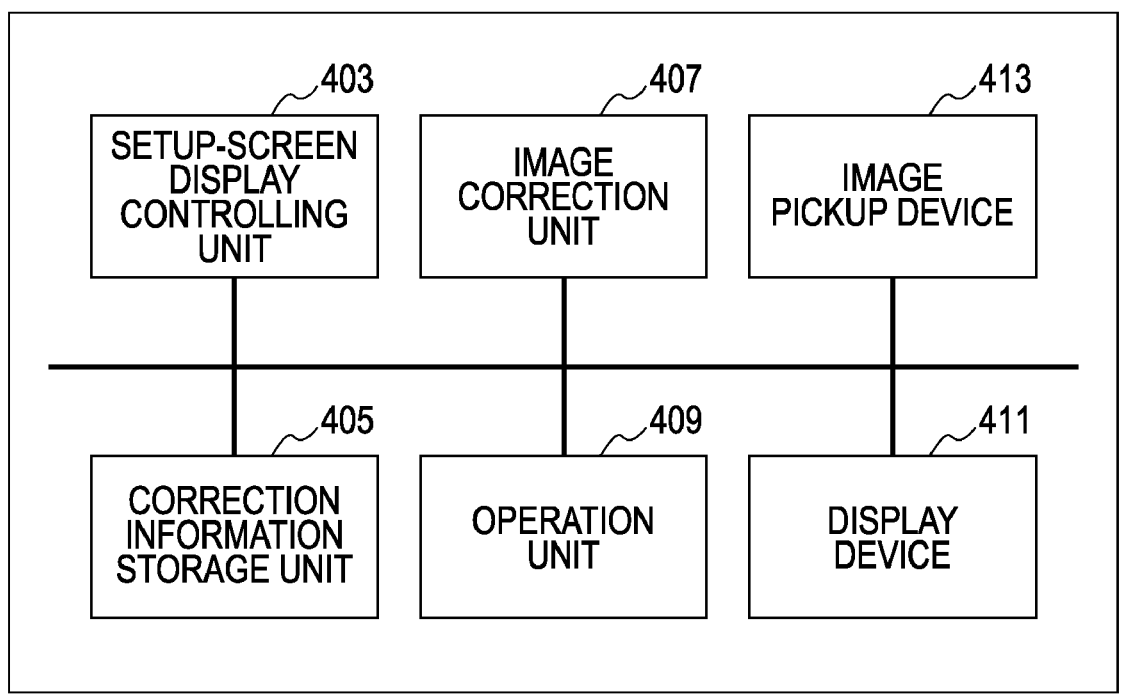
FIG. 16 is a block diagram showing an example of the configuration of an image pickup system to which the setup-screen display controlling function is applied according to an embodiment of the present invention.

FIG. 16 is a block diagram showing an example of the configuration of an image pickup system 401 to which the setup-screen display controlling function is applied according to an embodiment of the present invention. The image pickup system 401 includes a setup-screen display controlling unit 403, a correction information storage unit 405, an image correction unit 407, an operation unit 409, a display device 411, and an image pickup device 413. These processing functions are realized by software processing executed in the computer.

The basic configuration of the image pickup system 401 is the same as that of the image processing system 301 shown in FIG. 15. However, the image pickup system 401 differs from the image processing system 301 in that the image pickup system 401 includes the image pickup device 413. The image pickup device 413 need not be incorporated in the image pickup system 401 and may be detachable from the image pickup system 401.

In the image pickup system 401, a mechanism for outputting only the image data subjected to the correction based on the set amount of correction may be adopted or a mechanism for outputting the set amount of correction as additional data along with the image data before the correction may be adopted. In both cases, it is possible to achieve the color reproducibility of the image, which is intended when the image is picked up, in the display or printing of the image.

The image pickup system 401 is, for example, a video camera, a personal digital assistant with a camera (a portable personal computer, a mobile telephone, a portable video game player, or a digital book), or a vide recording apparatus integrated with a camera.

Display System

Figure 17:
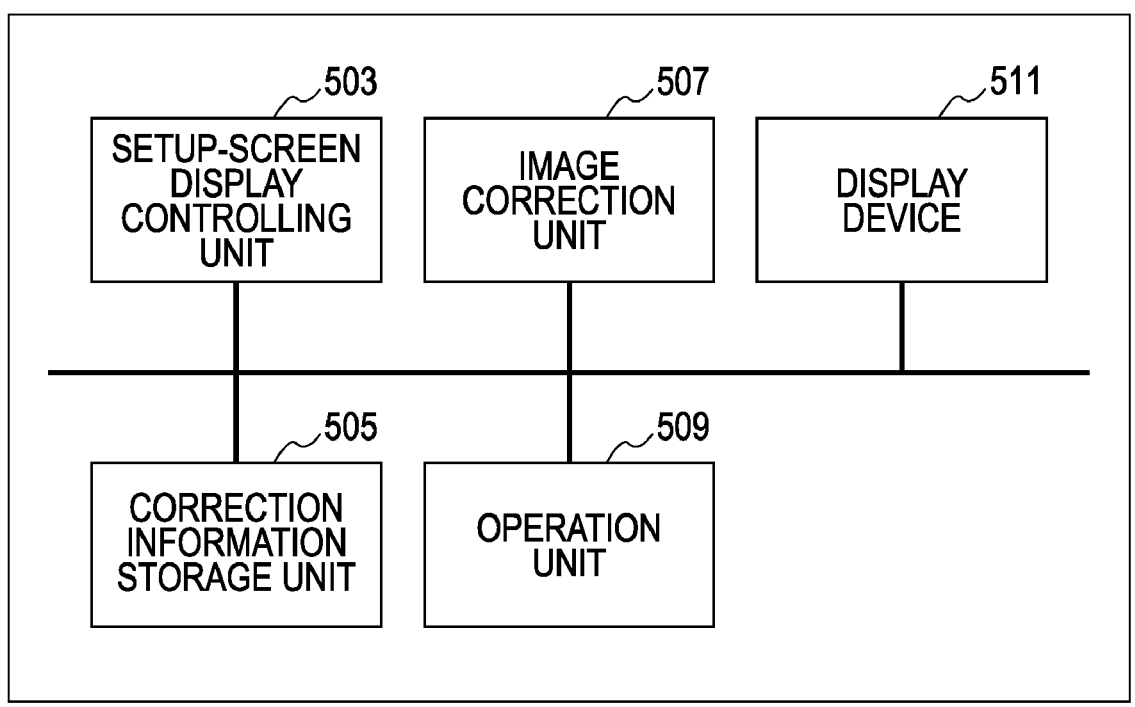
FIG. 17 is a block diagram showing an example of the configuration of a display system to which the setup-screen display controlling function is applied according to an embodiment of the present invention.

FIG. 17 is a block diagram showing an example of the configuration of a display system 501 to which the setup-screen display controlling function is applied according to an embodiment of the present invention. The display system 501 includes a setup-screen display controlling unit 503, a correction information storage unit 505, an image correction unit 507, an operation unit 509, and a display device 511. These processing functions are realized by software processing executed in the computer.

The basic configuration of the display system 501 is the same as that of the image processing system 301 shown in FIG. 15. However, the display system 501 shown in FIG. 17 differs from the general-purpose image processing system 301 in that the same system configuration as in FIG. 15 is realized in the display apparatus.

The display device 511 may be, for example, a cathode ray tube display device or a flat-panel display device (for example, a non-self-luminous liquid crystal display panel module, a self-luminous plasma display panel module, an organic electroluminescence (EL) display panel module, or a field emission display (FED) panel module).

The provision of the setup-screen display controlling function described above in the display system 501 allows the color tone of the displayed image to be easily and properly suited to the preference of the user.

Server-Client System

Figure 18:
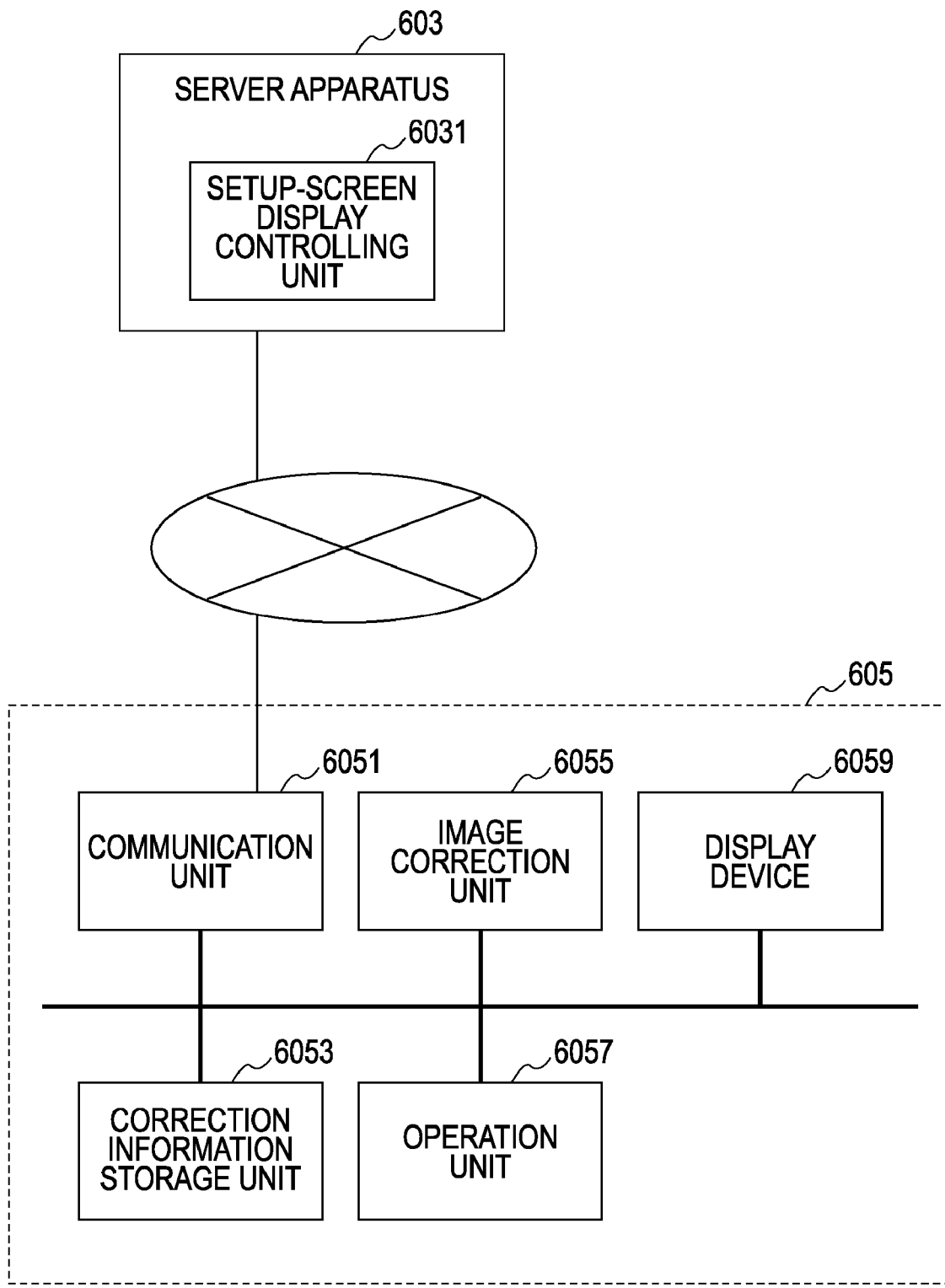
FIG. 18 is a block diagram showing an example of the configuration of a server-client system to which the setup-screen display controlling function is applied according to an embodiment of the present invention.

FIG. 18 is a block diagram showing an example of the configuration of a server-client system 601 to which the setup-screen display controlling function is applied according to an embodiment of the present invention. The server-client system 601 includes a server apparatus 603 and a client terminal 605 connected the server apparatus 603 over the Internet or another network. The server apparatus 603 includes a setup-screen display controlling unit 6031.

The client terminal 605 includes a communication unit 6051, a correction information storage unit 6053, an image correction unit 6055, an operation unit 6057, and a display device 6059.

In the server-client system 601, the server apparatus 603 performs the setup-screen display controlling function and the client terminal 605 displays the operation screen and stores the set amount of correction.

The basic configuration of the server-client system 601 is the same as that of the image processing system 301 shown in FIG. 15.

In the server-client system 601 in FIG. 18, the set amount of correction is stored in the client terminal 605 used by the user of the service. With this configuration, it is possible to automatically correct the color tones of the image output through the client terminal 605 and the image stored in the client terminal 605 so as to be suited to the preference of the user.

The amount of correction set with the setup-screen display controlling function may be stored in the server apparatus 603 and may be downloaded, if needed.

This system configuration can be adopted to provide the mechanism with which the amount of correction can be easily set as a new service for the user.

Other Embodiments

The color tones of the face color, blue, green, white (gray), and black are set in the sample image 201 in the above embodiments of the present invention.

However, part of the color tones may be set. For example, the color tones of the face color (flesh color), blue, green, and white (gray) may be set in the sample image 201. Alternatively, the color tones of any two colors among the five colors may be set in the sample image 201.

The sample image 201 in which the five subject groups corresponding to the five color tones are arranged is prepared in advance in the above embodiments of the present invention.

However, the user may vary the sample image 201 in accordance with the combination of colors of which the user wants to correct the color tones and the content of the screen.

For example, a daytime sample image and a night sample image may be prepared and either of them may be selected on the basis of which sample image the output image or the picked-up image corresponds to. The selection of the sample images in accordance with the object of the user allows the color tone of the output image or the picked-up image to be made closer to the preference of the user.

Only the amounts of correction determined for every color to be corrected are stored in the correction information storage unit in the above embodiments of the present invention.

However, the sample image in which the amount of correction is adjusted in accordance with the preference of the user may be stored in the correction information storage unit as a reference image used in the subsequent correction.

The sample image prepared in advance (the screen in which the correspondence between the colors to be corrected and the corresponding subject groups is set) is used to adjust the amounts of correction for every color to be corrected in the above embodiments of the present invention.

However, the sample image may also be set for a subject image selected by the user.

In this case, it is necessary to associate the settings of the subject groups with the setting input fields for the set subject groups.

The setup can be performed by an existing image recognition technology or by a method in which the user manually input the settings.

For example, the "face of a person" as an image area can be automatically extracted with a higher accuracy by adopting an existing image recognition technology. Many subject groups other than the subject group for the "face of a person" can be automatically recognized by comparison with feature information (for example, color distribution) set in advance.

When the automatic recognition technology is adopted, 100% reliability is not ensured. Accordingly, a mechanism for fine tuning of an area cut out by the user by the automatic recognition technology or a mechanism for correcting the association between the subject groups and the setting input fields (colors), which is performed in conjunction with the automatic recognition, is additionally provided.

It is enough for the subject groups to be used for the confirmation of the correction effect. Accordingly, it is not necessary to accurately cut out the outer edges of the areas.

Figure 19:
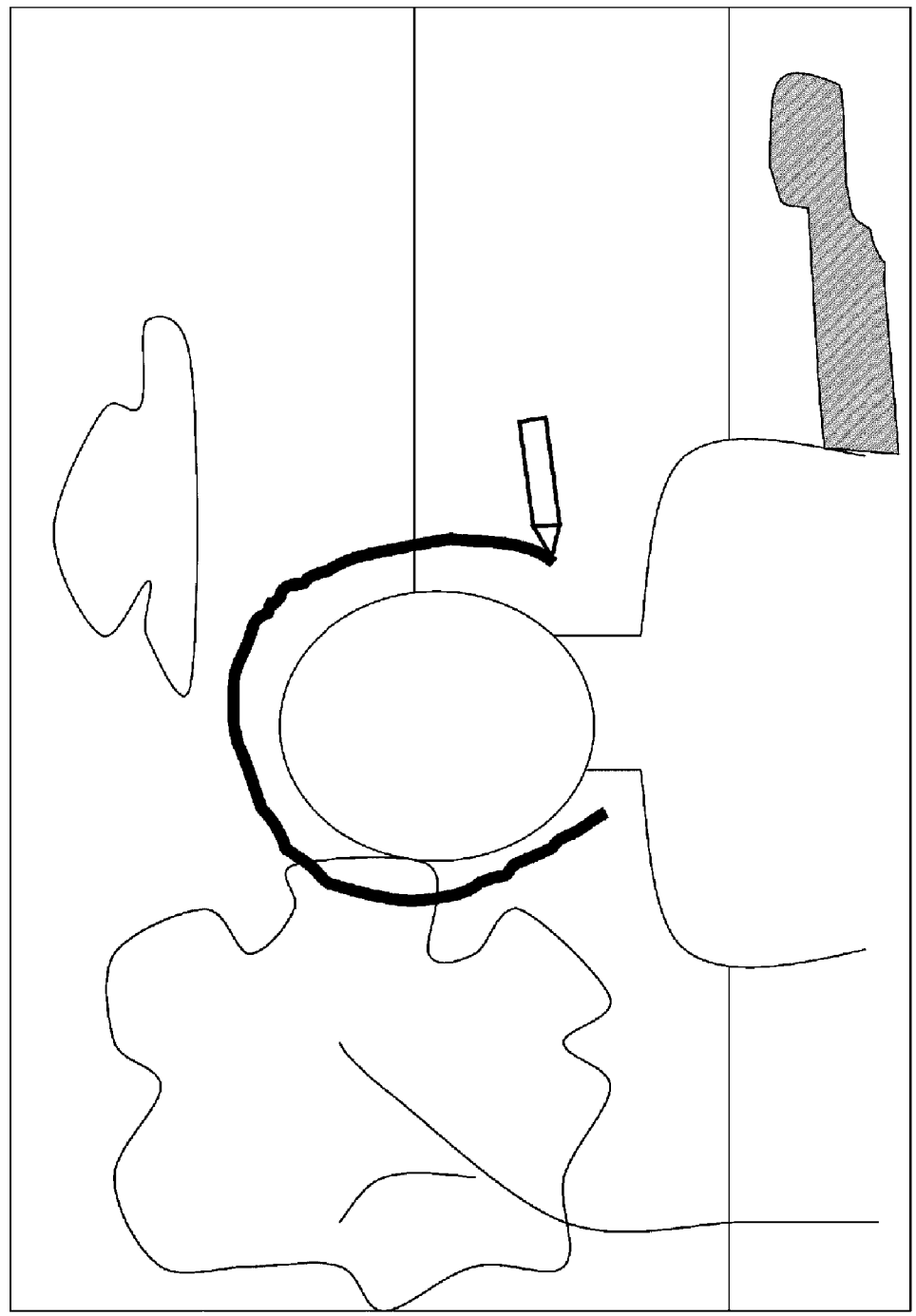
FIG. 19 shows how the subject group is manually set and input.

The user may specify the area of a subject group in the sample image in a manner shown in FIG. 19. FIG. 19 shows how the subject group corresponding to "the face of a person" is set and input in the sample image by the same method as rendering software. When the subject group is manually specified, a process of registering the correspondence between the specified subject group and the setting input field (color) is also provided.

The function of controlling display of the user interface screen to set the amount of correction of each color to be corrected is realized as software in the sample image in which the setting input field prepared for each color is associated with the corresponding subject group in the above embodiments of the present invention.

However, all or part of the similar function may be realized as hardware.

It should be understood by those skilled in the art that various modifications, combinations, sub-combinations and alterations may occur depending on design requirements and other factors insofar as they are within the scope of the appended claims or the equivalents thereof.

What is claimed is:

1. A setup-screen display controlling apparatus comprising:
   a sample image display controlling unit that displays a sample image on a screen of a display device in which a plurality of subject groups set for every color to be corrected are arranged on the setup screen for confirmation of a correction effect involved in adjustment of an amount of color correction;
   a setting-input-filed display controlling unit that displays a setting input field for the amount of color correction in the sample image;
   a correspondence indicating unit that explicitly indicates the correspondence between each subject group and the corresponding setting input field for the amount of color correction in the sample image;
   a correction information storage unit that stores the amount of color correction; and
   an image correction unit that performs color correction to image data on the basis of the amount of color correction read out from the correction information storage unit.

2. The setup-screen display controlling apparatus according to claim 1,
   wherein, in the sample image, the subject groups are set for every color to be corrected in an image of a subject arbitrarily selected by a user by an image recognition technology.

3. The setup-screen display controlling apparatus according to claim 1,
   wherein, in the sample image, the subject groups are set for every color to be corrected by a user in advance in an image of a subject arbitrarily selected by the user.

4. The setup-screen display controlling apparatus according to claim 1,
   wherein one of the subject groups is set for a person.

5. The setup-screen display controlling apparatus according to claim 1,
   wherein one of the subject groups is set for a subject in blue.

6. The setup-screen display controlling apparatus according to claim 1, wherein one of the subject groups is set for a subject in green.

7. The setup-screen display controlling apparatus according to claim 1,
wherein one of the subject groups is set for a subject in white.

8. The setup-screen display controlling apparatus according to claim 1,
wherein one of the subject groups is set for a subject in black.

9. The setup-screen display controlling apparatus according to claim 1,
wherein both a daytime sample image and a night sample image are prepared.

10. The setup-screen display controlling apparatus according to claim 1,
wherein image data displayed in the sample image to which the amount of color correction is applied is stored in a recording medium.

11. A server apparatus comprising:
a sample image display controlling unit that displays on a screen of a display device a sample image in which a plurality of subject groups set for every color to be corrected are arranged on a screen of a client terminal connected to the server apparatus over a network for confirmation of a correction effect involved in adjustment of an amount of color correction;
a setting-input-filed display controlling unit that displays a setting input field for the amount of color correction in the sample image on the screen of the client terminal;
a correspondence indicating unit that explicitly indicates the correspondence between each subject group and the corresponding setting input field for the amount of color correction in the sample image on the screen of the client terminal;
a correction information storage unit that stores the amount of color correction; and
an image correction unit that performs color correction to image data on the basis of the amount of color correction read out from the correction information storage unit.

12. An image processing configuration comprising:
a display device;
a sample image display controlling unit that displays a sample image in which a plurality of subject groups set for every color to be corrected are arranged on a screen of the display device for confirmation of a correction effect involved in adjustment of an amount of color correction;
a setting-input-filed display controlling unit that displays a setting input field for the amount of color correction in the sample image;
a correspondence indicating unit that explicitly indicates the correspondence between each subject group and the corresponding setting input field for the amount of color correction in the sample image;
a correction information storage unit that stores the amount of color correction; and
an image correction unit that performs color correction to image data on the basis of the amount of color correction read out from the correction information storage unit
wherein,
the foregoing units are configured portions of one or more digital processing apparatus.

13. A printing apparatus comprising:
a display device;
a sample image display controlling unit that displays a sample image in which a plurality of subject groups set for every color to be corrected are arranged on a screen of the display device for confirmation of a correction effect involved in adjustment of an amount of color correction;
a setting-input-filed display controlling unit that displays a setting input field for the amount of color correction in the sample image on the screen of the display device;
a correspondence indicating unit that explicitly indicates the correspondence between each subject group and the corresponding setting input field for the amount of color correction in the sample image on the screen of the display device;
a correction information storage unit that stores the amount of color correction;
an image correction unit that performs color correction to image data on the basis of the amount of color correction read out from the correction information storage unit; and
an image forming device that forms an image on a recording medium on the basis of the image data subjected to the color correction.

14. An image pickup apparatus comprising:
an image pickup unit;
a display device;
a sample image display controlling unit that displays a sample image in which a plurality of subject groups set for every color to be corrected are arranged on a screen of the display device for confirmation of a correction effect involved in adjustment of an amount of color correction;
a setting-input-filed display controlling unit that displays a setting input field for the amount of color correction in the sample image on the screen of the display device;
a correspondence indicating unit that explicitly indicates the correspondence between each subject group and the corresponding setting input field for the amount of color correction in the sample image on the screen of the display device;
a correction information storage unit that stores the amount of color correction; and
an image correction unit that performs color correction to image data that is picked up by the image pickup unit on the basis of the amount of color correction read out from the correction information storage unit.

15. An image pickup apparatus comprising:
an image pickup unit;
a display device;
a sample image display controlling unit that displays a sample image in which a plurality of subject groups set for every color to be corrected are arranged on a screen of the display device for confirmation of a correction effect involved in adjustment of an amount of color correction;
a setting-input-filed display controlling unit that displays a setting input field for the amount of color correction in the sample image on the screen of the display device;
a correspondence indicating unit that explicitly indicates the correspondence between each subject group and the corresponding setting input field for the amount of color correction in the sample image on the screen of the display device; and
a correction information storage unit that stores the amount of color correction as additional data concerning image data that is picked up by the image pickup unit.

16. A display apparatus comprising:

a display device;

a sample image display controlling unit that displays a sample image in which a plurality of subject groups set for every color to be corrected are arranged on a screen of the display device for confirmation of a correction effect involved in adjustment of an amount of color correction;

a setting-input-filed display controlling unit that displays a setting input field for the amount of color correction in the sample image on the screen of the display device;

a correspondence indicating unit that explicitly indicates the correspondence between each subject group and the corresponding setting input field for the amount of color correction in the sample image on the screen of the display device;

a correction information storage unit that stores the amount of color correction; and an image correction unit that performs color correction to image data on the basis of the amount of color correction read out from the correction information storage unit.

17. A digital processor carrying out a setup-screen display controlling method comprising the steps of:

displaying a sample image on a screen of display device in which a plurality of subject groups set for every color to be corrected are arranged for confirmation of a correction effect involved in adjustment of an amount of color correction;

displaying a setting input field for the amount of color correction in the sample image;

explicitly indicating the correspondence between each subject group and the corresponding setting input field for the amount of color correction in the sample image;

storing in a storage unit correction information indicating the amount of color correction; and performing color correction to image data on the basis of the amount of color correction indicated by the correction information in the storage unit.

18. A computer-readable storage medium having stored thereon a program causing a computer to execute the steps of:

displaying a sample image on a screen of a display device in which a plurality of subject groups set for every color to be corrected are arranged for confirmation of a correction effect involved in adjustment of an amount of color correction;

displaying a setting input field for the amount of color correction in the sample image; and explicitly indicating the correspondence between each subject group and the corresponding setting input field for the amount of color correction in the sample image.

* * * * *